United States Patent
Choi et al.

(10) Patent No.: US 12,429,632 B2
(45) Date of Patent: Sep. 30, 2025

(54) WINDOW AND DISPLAY DEVICE INCLUDING SAME

(71) Applicant: Samsung Display Co., Ltd., Yongin-si (KR)

(72) Inventors: Min-Hoon Choi, Seoul (KR); Minsang Koo, Seongnam-si (KR); Kyung-Man Kim, Anyang-si (KR); Sanghoon Kim, Hwaseong-si (KR); Seungho Kim, Asan-si (KR); Seongjin Hwang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 149 days.

(21) Appl. No.: 17/240,571

(22) Filed: Apr. 26, 2021

(65) Prior Publication Data

US 2022/0043187 A1 Feb. 10, 2022

(30) Foreign Application Priority Data

Aug. 6, 2020 (KR) .................. 10-2020-0098804

(51) Int. Cl.
*G02B 1/14* (2015.01)
*B32B 3/26* (2006.01)
(Continued)

(52) U.S. Cl.
CPC ............... *G02B 1/14* (2015.01); *B32B 3/266* (2013.01); *B32B 7/12* (2013.01); *B32B 17/10* (2013.01); *B32B 27/40* (2013.01); *G06F 1/1616* (2013.01); *G06F 1/1652* (2013.01); *H04M 1/0216* (2013.01); *H04M 1/0268* (2013.01); *B32B 2307/51* (2013.01); *B32B 2457/20* (2013.01)

(58) Field of Classification Search
None
See application file for complete search history.

(56) References Cited

U.S. PATENT DOCUMENTS 8,845,916 B2 9/2014 Shin
9,259,898 B2 2/2016 Hirai et al.
(Continued)

FOREIGN PATENT DOCUMENTS

CN 103192558 7/2013
CN 103578356 2/2014
(Continued)

OTHER PUBLICATIONS

Extended European search report for European Patent Application or Patent No. 21189619.6 dated Jan. 17, 2022.
(Continued)

*Primary Examiner* — Anthony J Frost
(74) *Attorney, Agent, or Firm* — KILE PARK REED & HOUTTEMAN PLLC

(57) ABSTRACT

A window includes a window layer that includes a first section, a second section, and a folding section that is disposed between the first section and the second section and is foldable with respect to a folding axis extending in a direction. The folding section includes at least one opening pattern, and in a plan view, a maximum distance between two points on an inner line of the folding section that defines the at least one opening pattern is about 10 micrometers to about 200 micrometers.

21 Claims, 22 Drawing Sheets

(51) Int. Cl.
*B32B 7/12* (2006.01)
*B32B 17/10* (2006.01)
*B32B 27/40* (2006.01)
*G06F 1/16* (2006.01)
*H04M 1/02* (2006.01)

(56) References Cited

U.S. PATENT DOCUMENTS

| | | | |
|---|---|---|---|
| 10,164,208 B2 | 12/2018 | Lee et al. | |
| 10,274,653 B2 | 4/2019 | Cheon | |
| 10,345,856 B2 | 7/2019 | Song | |
| 10,416,721 B2 | 9/2019 | Shin et al. | |
| 10,770,678 B2 | 9/2020 | Hu | |
| 10,948,630 B2 | 3/2021 | Kim et al. | |
| 11,176,851 B2 | 11/2021 | Wang et al. | |
| 11,586,247 B2 | 2/2023 | Ryu et al. | |
| 2009/0096754 A1 | 4/2009 | Hinata | |
| 2014/0029212 A1* | 1/2014 | Hwang | H05K 1/028 361/749 |
| 2014/0334001 A1* | 11/2014 | Oh | G02B 5/3083 156/182 |
| 2015/0043174 A1 | 2/2015 | Han et al. | |
| 2016/0014881 A1* | 1/2016 | Shin | G06F 1/1616 361/749 |
| 2016/0014883 A1* | 1/2016 | Cho | H10K 77/111 361/749 |
| 2016/0221294 A1 | 8/2016 | Choi et al. | |
| 2016/0224068 A1* | 8/2016 | Choi | G06F 3/045 |
| 2016/0255713 A1* | 9/2016 | Kim | G09F 9/301 361/749 |
| 2017/0155084 A1 | 6/2017 | Park et al. | |
| 2017/0256422 A1 | 9/2017 | Ambrosius et al. | |
| 2018/0175310 A1* | 6/2018 | Lee | H10K 50/844 |
| 2019/0118281 A1 | 4/2019 | Ono | |
| 2019/0138059 A1 | 5/2019 | Choi et al. | |
| 2020/0095161 A1 | 3/2020 | Jeong et al. | |

FOREIGN PATENT DOCUMENTS

| | | |
|---|---|---|
| CN | 104347000 | 2/2015 |
| CN | 106023810 A | 10/2016 |
| CN | 108122502 | 6/2018 |
| CN | 108268170 | 7/2018 |
| CN | 108511501 | 9/2018 |
| CN | 208141720 | 11/2018 |
| CN | 108932903 | 12/2018 |
| CN | 110610979 A | 12/2019 |
| CN | 110767842 | 2/2020 |
| JP | 2007-094932 | 4/2007 |
| JP | 2019-219545 | 12/2019 |
| KR | 10-0969473 | 7/2010 |
| KR | 10-2016-0006585 | 1/2016 |
| KR | 10-2018-0057814 | 5/2018 |
| KR | 10-2018-0079093 | 7/2018 |
| KR | 10-2019-0065480 | 6/2019 |
| KR | 10-2019-0123428 | 11/2019 |

OTHER PUBLICATIONS

Office Action issued by CNIPA for Chinese Patent Application No. 202110828337.1 on Jul. 29, 2025, 6 pages.

* cited by examiner

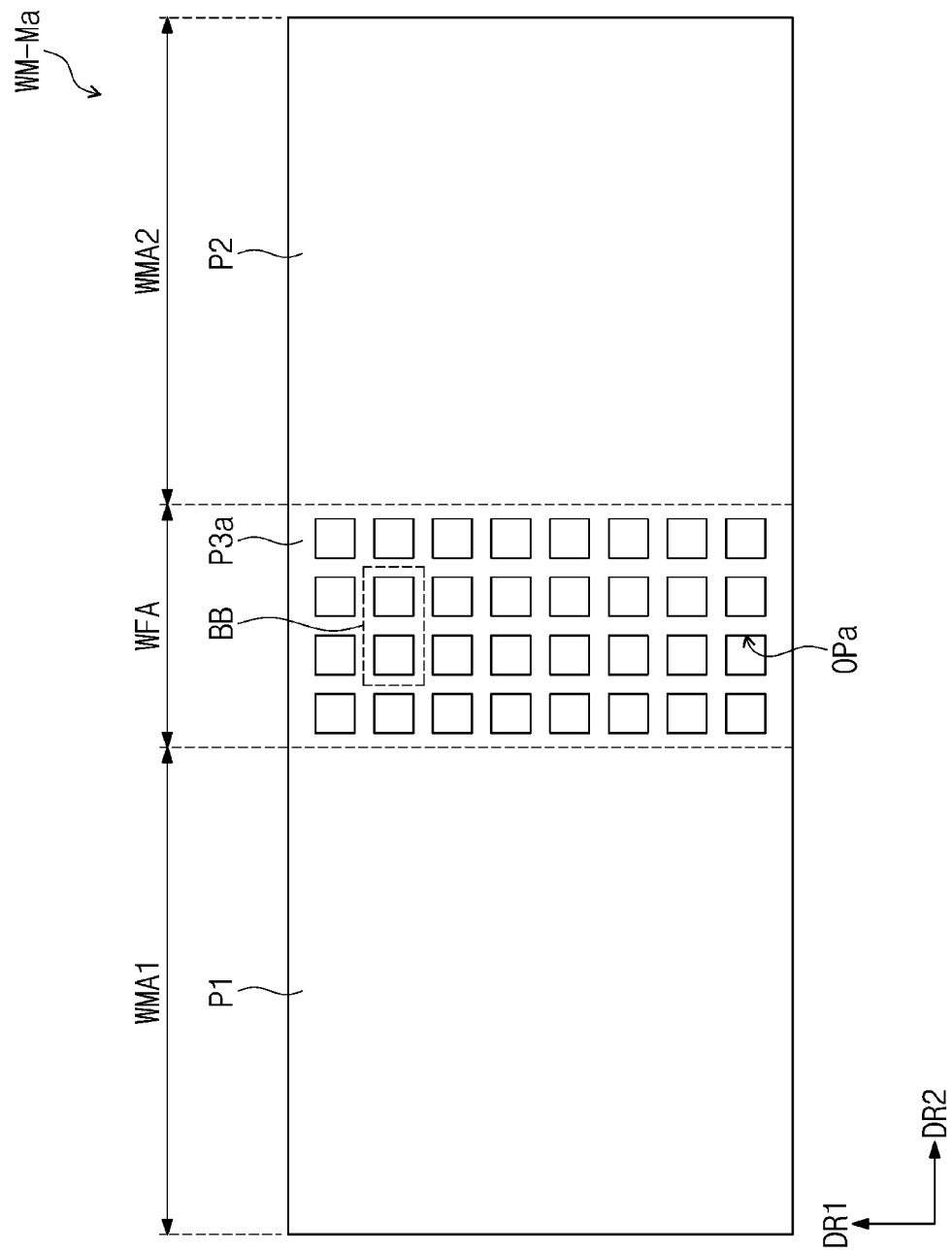

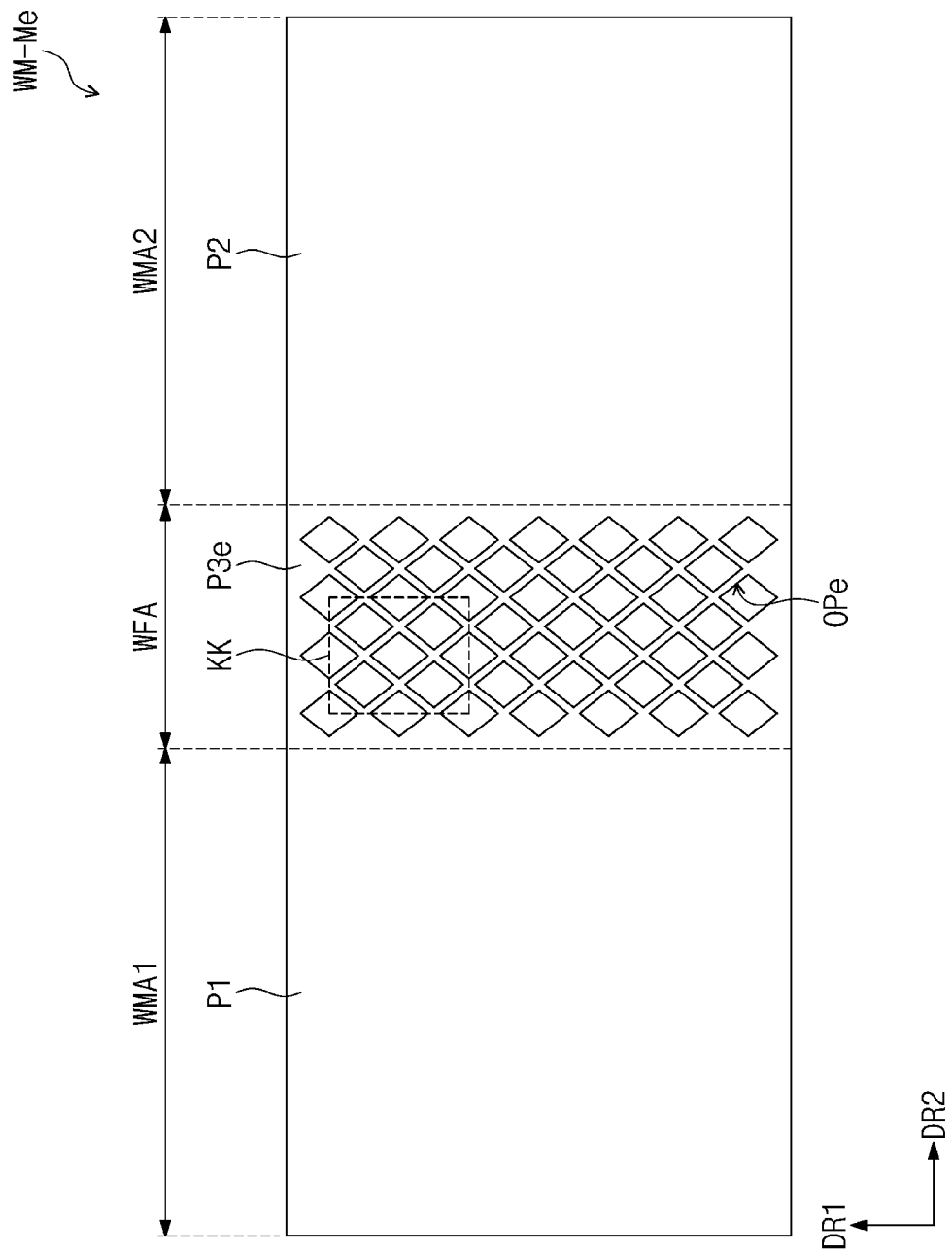

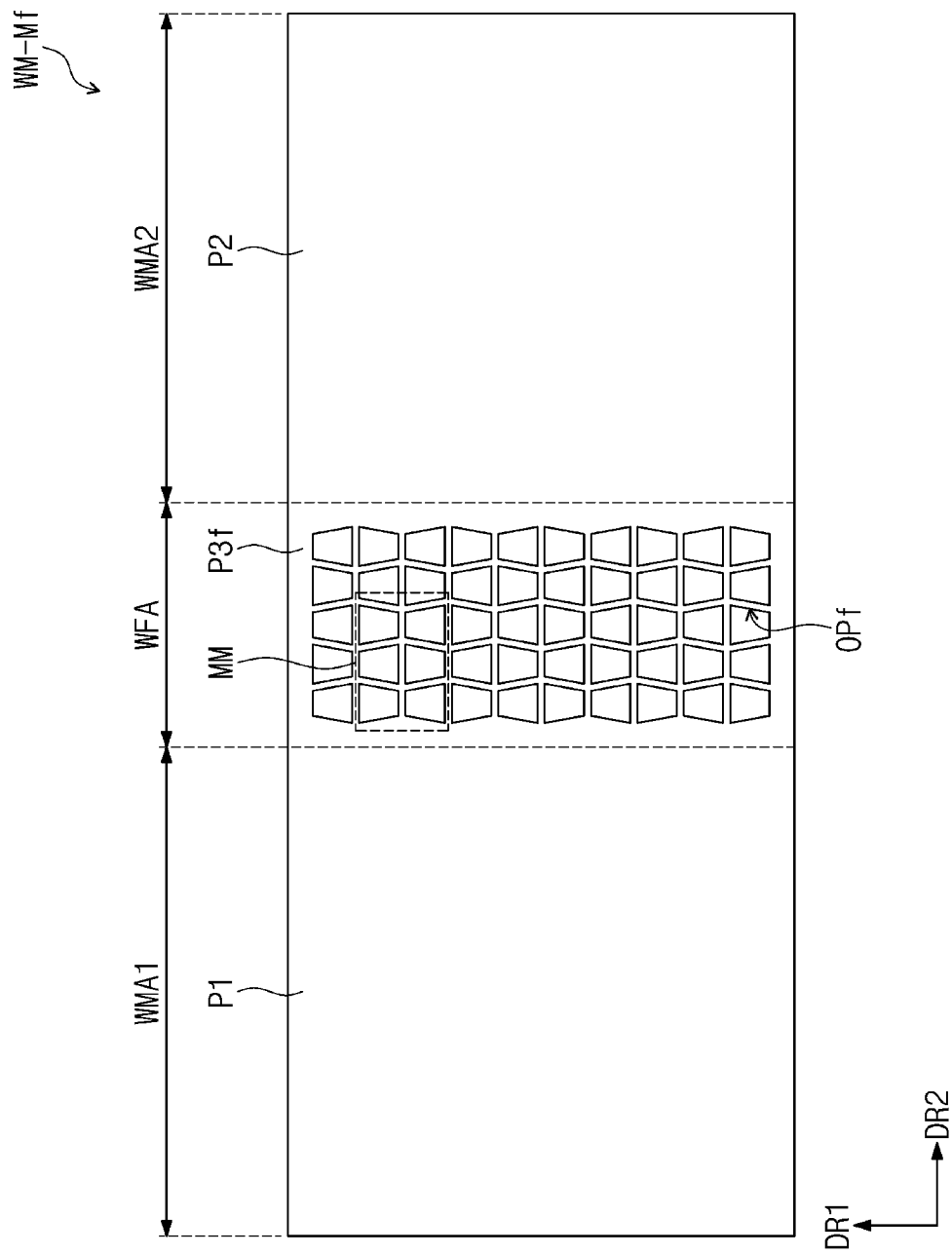

WINDOW AND DISPLAY DEVICE INCLUDING SAME

CROSS-REFERENCE TO RELATED APPLICATIONS

This U.S. non-provisional patent application claims priority to and the benefit of Korean Patent Application No. 10-2020-0098804 under 35 U.S.C. § 119, filed in the Korean Intellectual Property Office (KIPO) on Aug. 6, 2020, the entire contents of which are incorporated herein by reference.

BACKGROUND

The disclosure herein relates to a display device, and more specifically, to a window and a display device including same.

Various display devices used in multimedia apparatuses such as televisions, mobile phones, tablet computers, navigation devices, and game consoles have been developed. Such a display device may include a display module for displaying an image and sensing an external input, a polarizing layer disposed on a display panel, and a cover window. The display module may include a display panel for displaying an image and an input sensing unit for sensing an external input.

Recently, various type of display devices unlike a planar display device have been developed. For example, various flexible display devices such as a curved display device, a bending-type display device, a foldable display device, a rollable display device, and a stretchable display device have been developed.

SUMMARY

The disclosure provides a window and a display device including the same, wherein the window may be prevented from being cracked in a folding area, and the hardness of the window may be increased in a flat area.

An embodiment of the disclosure provides a window including a window layer that includes a first section, a second section, and a folding section that is disposed between the first section and the second section and is foldable with respect to a folding axis extending in a direction, wherein the folding section may include at least one opening pattern, and in a plan view, a maximum distance between two points on an inner line of the folding section that defines the at least one opening pattern is about 10 micrometers to about 200 micrometers.

In an embodiment, in a plan view, the at least one opening pattern may have a quadrilateral shape.

In an embodiment, the maximum distance may be a diagonal distance of the quadrilateral shape.

In an embodiment, the at least one opening pattern may have a rectangular shape extending in the direction.

In an embodiment, the at least one opening pattern may have a square shape.

In an embodiment, in a plan view, the at least one opening pattern may have a triangular shape.

In an embodiment, the inner line of the folding section may include a first inner line between a first vertex and a second vertex of the triangular shape; a second inner line between the second vertex and a third vertex of the triangular shape; and a third inner line between the third vertex and the first vertex of the triangular shape. The two points of the inner line of the folding section are any one vertex of the first to third vertices and a point on any one inner line spaced apart from the any one vertex.

In an embodiment, an angle between the maximum distance and the one inner line may be a right angle.

In an embodiment, each of the first section and the second section may include a first material, and the folding section may include a second material different from the first material.

In an embodiment, the second material may have an elastic modulus lower than an elastic modulus of the first material.

In an embodiment, the first material may be glass, and the second material may be urethane silicone.

In an embodiment, the window may further include a protective functional layer disposed above the window layer; an adhesive layer disposed below the window layer; and a light blocking layer that does not overlap the folding section and is disposed below the adhesive layer.

In an embodiment, the window may further include an assistant material that is flexible and disposed in the at least one opening pattern.

In an embodiment, the at least one opening pattern may include a plurality of opening patterns and spaced apart from each other, and in a plan view, each of the plurality of opening patterns may have a regular polygonal shape.

In an embodiment, in a plan view, the at least one opening pattern may have a trapezoidal shape.

In an embodiment, in a plan view, the at least one opening pattern may have a rhombic shape.

In an embodiment of the disclosure, a display device may include a display panel; and a window that is disposed on the display panel, that window including a first area, a second area, and a folding area disposed between the first area and the second area, wherein the window may include at least one opening pattern that overlaps the folding area, and in a plan view, a maximum distance between two points on an inner line of the window that defines the at least one opening pattern may be about 10 micrometers to about 200 micrometers.

In an embodiment, each of the first area and the second area may be flat and have a planar area larger than a planar area of the folding area.

In an embodiment, the window may be foldable with respect to a folding axis that extends in a direction, and the at least one opening pattern may extend in the direction.

In an embodiment, the at least one opening pattern may include a plurality of opening patterns, and the plurality of opening patterns may have a shape regularized along another direction perpendicular to the direction.

In an embodiment, in a plan view, the at least one opening pattern may have a regular polygonal shape.

In an embodiment, the window may include a first material in the first area and the second area and a second material that is different from the first material in the folding area, wherein the second material may have an elastic modulus lower than an elastic modulus of the first material.

In an embodiment, the at least one opening pattern may include a plurality of opening patterns, and the plurality of opening patterns may have a non-regularized shape.

In an embodiment of the disclosure, a window may include a window layer that includes a first section, a second section, and a folding section disposed between the first section and the second section, wherein the folding section may include at least one opening pattern, and in a plan view, a maximum distance between two points on an inner line of the folding section that defines the at least one opening pattern is set based on a radius of curvature of an external electronic pen that faces a top surface of the folding section and a depth of the external electronic pen inserted from the top surface of the folding section into the at least one opening pattern.

BRIEF DESCRIPTION OF THE DRAWINGS

The accompanying drawings are included to provide a further understanding of the disclosure and are incorporated in and form a part of this specification. The drawings illustrate some embodiments of the disclosure and, together with the description, serve to explain principles of the disclosure. In the drawings:

FIG. 11 is a schematic plan view of a window layer according to another embodiment of the disclosure;

FIG. 18A is a schematic plan view of a window layer according to another embodiment of the disclosure;

FIG. 19A is a schematic plan view of a window layer according to another embodiment of the disclosure.

DETAILED DESCRIPTION OF THE EMBODIMENTS

Figure 1:
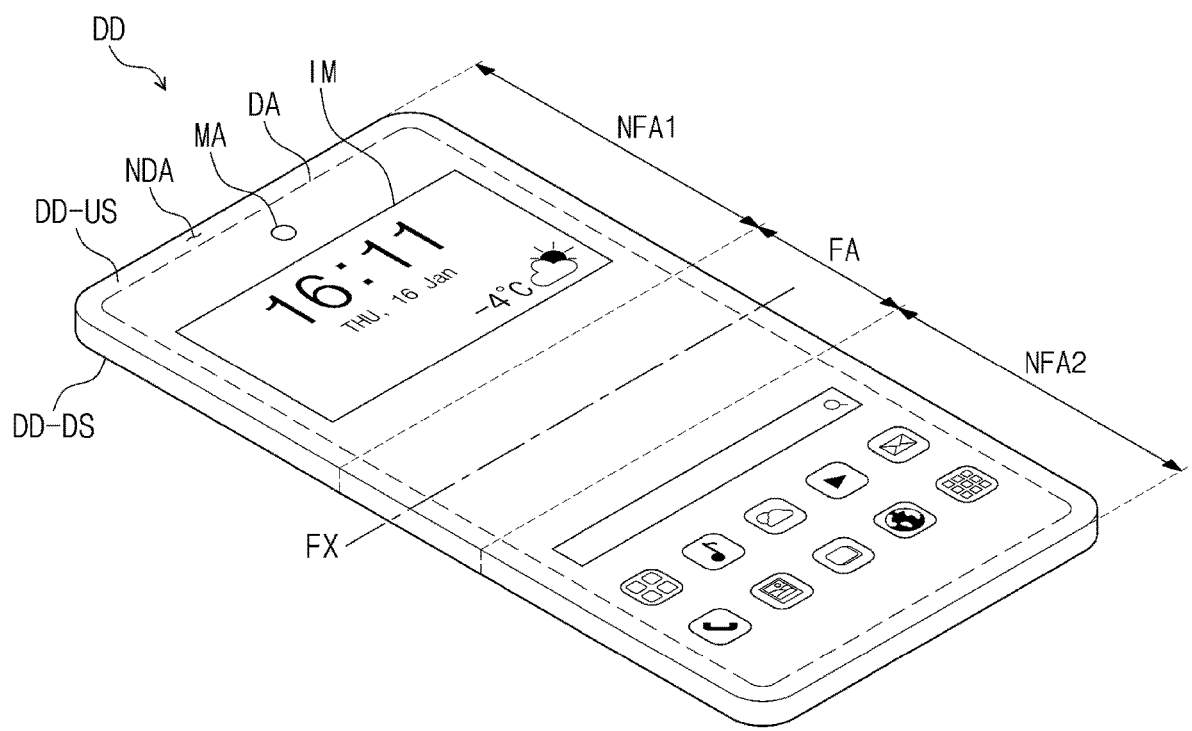
FIG. 1 is a schematic perspective view of a display device according to an embodiment of the disclosure.

In this specification, when an element (or a region, a layer, a portion, or the like) is referred to as "being on," "being connected to," or "being coupled to" another element, it may be directly disposed/connected/coupled to another element, or an intervening third element may also be disposed therebetween.

Like numbers refer to like elements throughout. Also, in the drawings, the thicknesses, ratios, and dimensions of the elements may be exaggerated for effective description of the technical contents.

The term "and/or" includes one or more combinations which may be defined by the associated elements. For example, "A and/or B" may be understood to mean "A, B, or A and B."

It will be understood that, although the terms first, second, and the like may be used herein to describe various elements, these elements should not be limited by these terms. These terms are only used to distinguish one element from another element. For example, a first element may be referred to as a second element, and similarly, a second element may be referred to as a first element without departing from the scope of the disclosure. The singular forms include the plural forms unless the context clearly indicates otherwise.

Also, terms of "below," "lower," "above," "upper" may be used to describe the relationships of the components illustrated in the drawings. These terms have a relative concept and are described on the basis of the directions indicated in the drawings.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and the disclosure, and will not be interpreted in an ideal or excessively formal sense unless clearly so defined herein.

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that the term "includes" or "comprises," when used in this specification, specifies the presence of stated features, integers, steps, operations, elements, components, or a combination thereof, but does not preclude the presence or addition of one or more other features, integers, steps, operations, elements, components, or combinations thereof.

Hereinafter, embodiments of the disclosure will be described with reference to the accompanying drawings.

Figure 2A:
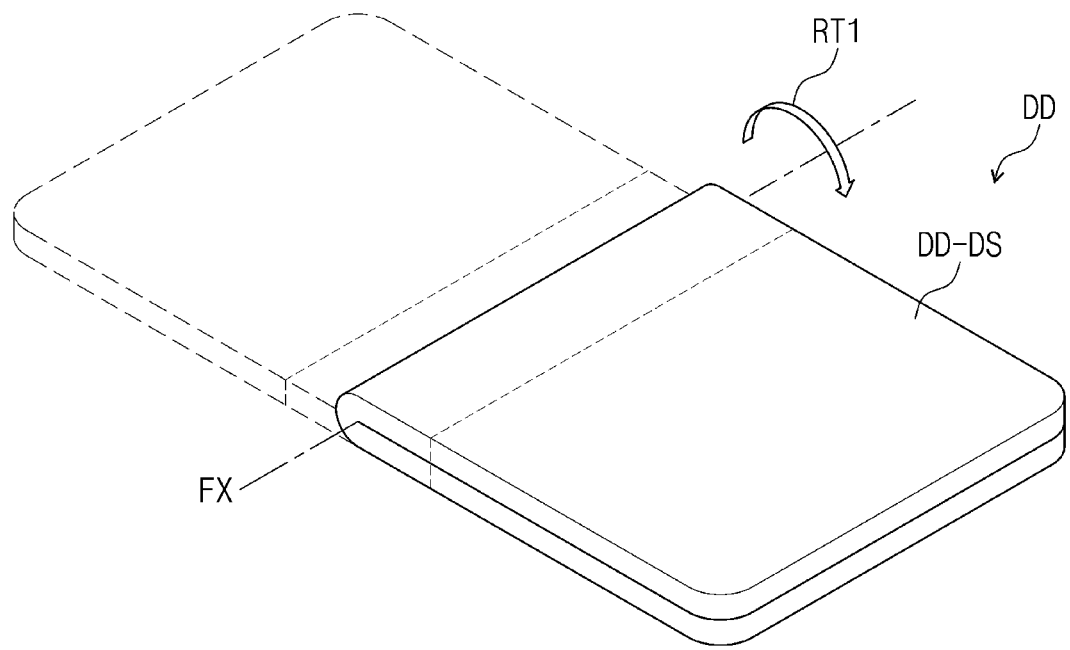
FIG. 2A is a schematic perspective view of a display device folded about a folding axis according to an embodiment of the disclosure.
Figure 2B:
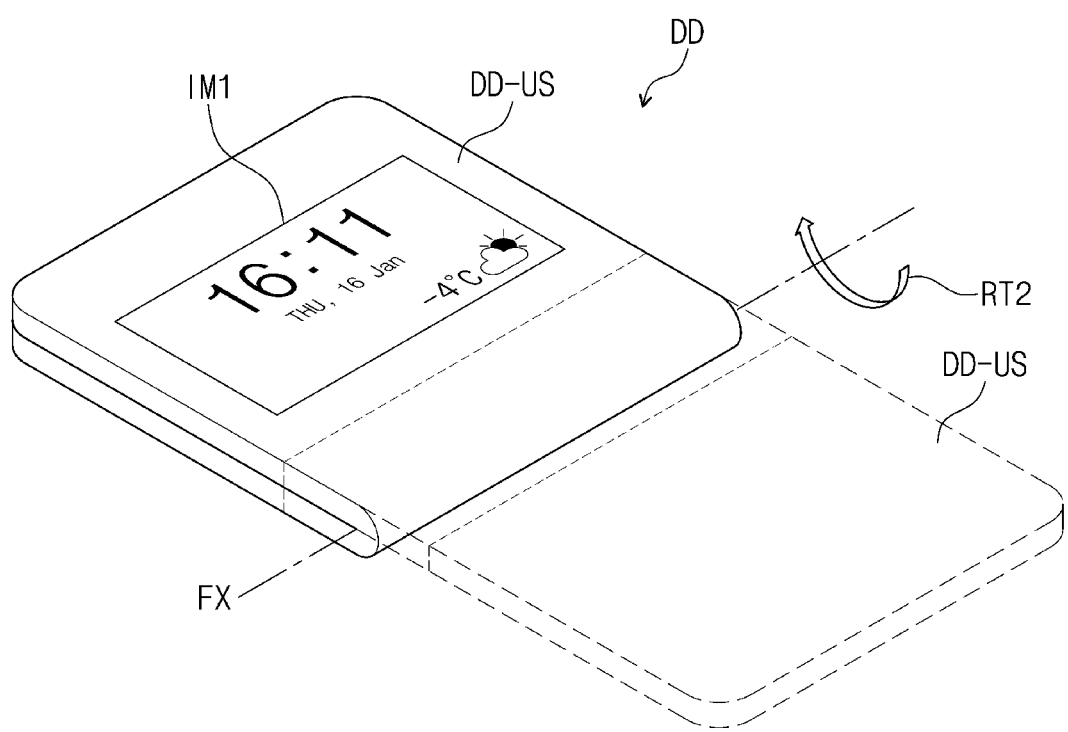
FIG. 2B is a schematic perspective view of a display device folded about a folding axis according to an embodiment of the disclosure.

FIG. 1 is a schematic perspective view of a display device according to an embodiment. FIG. 2A is a schematic perspective view of a display device folded about a folding axis according to an embodiment. FIG. 2B is a schematic perspective view of a display device folded about a folding axis according to an embodiment.

According to an embodiment, a foldable display device DD is illustrated. However, the embodiment is not limited thereto and may be applied to various types of display devices such as a curved display device, a bending-type display device, a rollable display device, and a stretchable display device.

Referring to FIG. 1, a display device DD includes areas distinguished on the display surface. The display surface may be divided into a display area DA on which an image IM is actually displayed and a non-display area NDA on which the image IM is not displayed. The display area DA is an area in which an image is displayed, and the non-display area NDA is an area which is adjacent to the display area DA and in which an image is not displayed.

For example, the display device DD illustrated in FIG. 1 is provided as a smart phone having a quadrilateral shape and displays the image IM of weather information and icons. The non-display area NDA may be adjacent to the display area DA and/or surround the display area DA, and in another embodiment, the non-display area NDA may be omitted.

Here, the display surface is substantially parallel to a plane defined by a first direction DR1 and a second direction DR2. A direction of a normal to the display surface, that is, a thickness direction of the display device DD is indicated as a third direction DR3. In the disclosure, the expression of "when viewed in a plan view" or "in a plan view" may mean when viewed from above in the third direction DR3. A front surface (or a top surface) and a rear surface (or a bottom surface) of each layer or each unit to be described below are distinguished by the third direction DR3. However, directions indicated as the first to third directions DR1, DR2, and DR3 have relative concepts and thus may be changed to other directions, for example, reverse directions.

According to an embodiment, the display device DD may include a folding area FA folded along or with respect to a folding axis FX, a first non-folding area NFA1, and a second non-folding area NFA2. The first non-folding area NFA1 and the second non-folding area NFA2 are apart from each other in the second direction DR2 with the folding area FA therebetween. The folding axis FX may be substantially parallel to the first direction DR1.

A top surface DD-US of the display device DD may include a first display surface overlapping the first non-folding area NFA1, a second display surface overlapping the second non-folding area NFA2, and a third display surface overlapping the folding area FA. A bottom surface DD-DS of the display device DD may be opposite to the top surface DD-US. The first to third display surfaces may display an image or images different from each other.

Also, according to an embodiment, the display device DD may further include a module area MA surrounded by the display area DA. The module area MA may overlap at least one of the first non-folding area NFA1 and the second non-folding area NFA2. The module area MA may overlap an electronic module included in the display device DD. For example, the electronic module may include at least one of a camera, a speaker, a light detection sensor, and a heat detection sensor.

Referring to FIGS. 2A and 2B, the display device DD according to an embodiment may be folded in two directions about the folding axis FX.

Referring to FIG. 2A, the folding area FA may be folded along the folding axis FX such that the first display surface and the second display surface face each other. In this case, the folding area FA may be folded along a first rotation RT1, and the bottom surface DD-DS of the display device DD is exposed to the outside.

As illustrated in FIG. 2B, the folding area FA may be folded along the folding axis FX such that the first display surface and the second display surface are exposed to the outside. In this case, the folding area FA may be folded along a second rotation RT2, and the top surface DD-US of the display device DD is exposed to the outside. The image IM1 may be displayed on the top surface DD-US exposed to the outside.

As described above, the display device DD may be folded along the folding axis FX such that the first display surface of the first non-folding area NFA1 and the second display surface of the second non-folding area NFA2 face each other, and this may be defined as inner folding. Also, the display device DD may be folded along the folding axis FX such that the first display surface of the first non-folding area NFA1 and the second display surface of the second non-folding area NFA2 face the outside, and this may be defined as outer folding.

Figure 3:
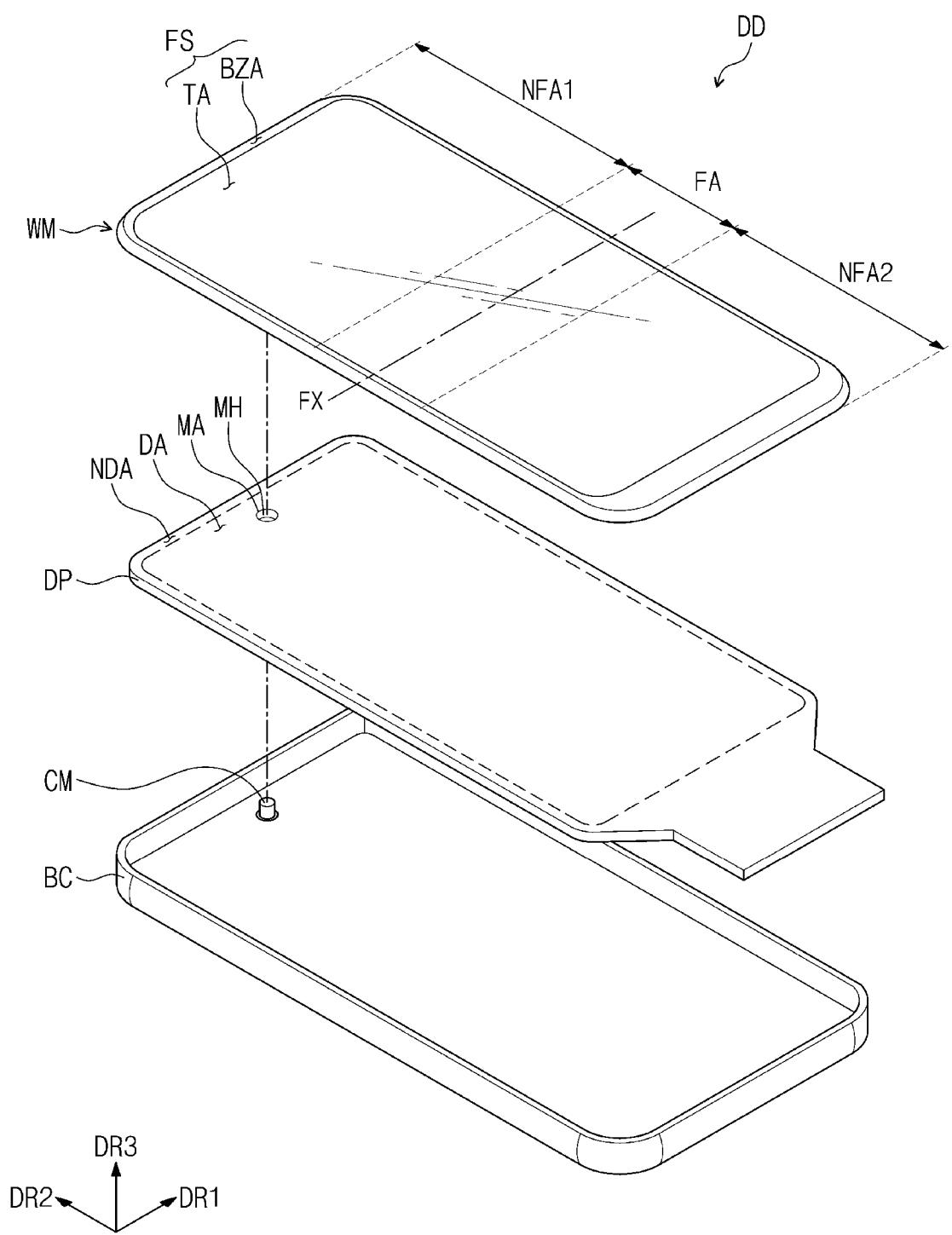
FIG. 3 is a schematic exploded perspective view of a display device according to an embodiment of the disclosure.

FIG. 3 is a schematic exploded perspective view of a display device according to an embodiment.

Referring to FIG. 3, a display device DD may include a window WM, a display panel DP, an electronic module CM, and a case BC. The window WM and the case BC are connected to each other to define the exterior of the display device DD.

The window WM is disposed on the display panel DP to cover or overlap a front surface of the display panel DP. The window WM may include an optically transparent insulating material. For example, the window WM may include glass or plastic. The window WM may have a multilayer or single layer structure. For example, the window WM may have a structure in which plastic films are stacked on and connected to each other through adhesives, or a structure in which the glass substrate is stacked on and connected to the plastic film through an adhesive.

The window WM may include a front surface FS exposed to the outside. The display surface of the display device DD may be substantially defined by the front surface FS of the window WM. A transmission area TA may be an optically transparent area. The transmission area TA may have a shape corresponding to the display area DA. For example, the transmission area TA overlaps the entire surface or at least a portion of the display area DA. The image IM displayed on the display area DA of the display panel DP may be viewed from the outside through the transmission area TA.

A bezel area BZA may be an area having a relatively lower light transmittance than the transmission area TA. The bezel area BZA may define a shape of the transmission area TA. The bezel area BZA may be adjacent to the transmission area TA and may surround the transmission area TA.

The bezel area BZA may have a predetermined color. In case that the window WM is provided as a glass or plastic substrate, the bezel area BZA may be a color layer which is printed or deposited on a surface of the glass or plastic substrate. As another example, the bezel area BZA may be formed by coloring the relevant area of the glass or plastic substrate.

In an embodiment, the bezel area BZA may cover or overlap a peripheral area NDA of the display panel DP to prevent the peripheral area NDA from being viewed from the outside. However, this is merely an example. The bezel area BZA may be omitted in the window WM according to an embodiment of the disclosure.

According to an embodiment, the front surface of the display panel DP includes a first panel area and a second panel area adjacent to the first panel area. The first panel area may correspond to the module area MA and the display area DA surrounding the module area MA, and the second panel area may correspond to the peripheral area NDA. The display area DA may correspond to an area that is activated in response to an electrical signal. The module area MA and the second panel area may be defined as a non-display area in which an image is not displayed.

A side of the peripheral area NDA of the display panel DP may have a bent shape. As a result, a portion of the peripheral area NDA faces a rear surface of the display panel DP, and thus, the bezel area BZA on the front surface of the window WM may be reduced. However, the embodiment is not limited thereto, and the display panel DP may be assembled in a flat state in which the display area DA and the peripheral area NDA face the window WM.

When compared to the same area, the module area MA may have relatively higher light transmittance than the display area DA. The module area MA is defined at a position overlapping an electronic module CM in a plan view, which will be described below.

At least a portion of the module area MA may be surrounded by the display area DA. In the embodiment, the module area MA may be apart from the peripheral area NDA. The module area MA is illustrated as being defined within the display area DA so that the entire edge thereof is surrounded by the display area DA.

The display panel DP may include a module hole MH which is defined inside the module area MA and passes through the display panel DP. The module hole MH may pass through the display panel DP. An edge of the module area MA may have a shape corresponding to that of the module hole MH.

The electronic module CM is disposed below the window WM. The electronic module CM may overlap the module hole MH defined in the module area MA. The electronic module CM may receive an external input transmitted through the module area MA or provide an output through the module area MA.

In the electronic module CM, a reception part for receiving the external input and an output part for providing the output may overlap the module area MA in a plan view. A portion or all of the electronic module CM may be accommodated in the module area MA or the module hole MH. According to an embodiment, as the electronic module CM is disposed overlapping the display area DA, the surface area of the bezel area BZA may be reduced.

Although not illustrated in FIG. 3, the display device DD may further include an input sensing layer which is disposed between the display panel DP and the window WM to sense an external input. Here, the external input includes various types of external inputs such as a portion of the body of a user, a stylus pen, light, heat, pressure, or the like. A contact with a part of the user's body such as a hand or a spatial touch (for example, hovering) approaching or adjacent may be a form of input. Also, in a case where the display device DD further includes the input sensing layer, the module hole MH may pass through the display panel DP and the input sensing layer which overlap the module area MA.

Figure 4:
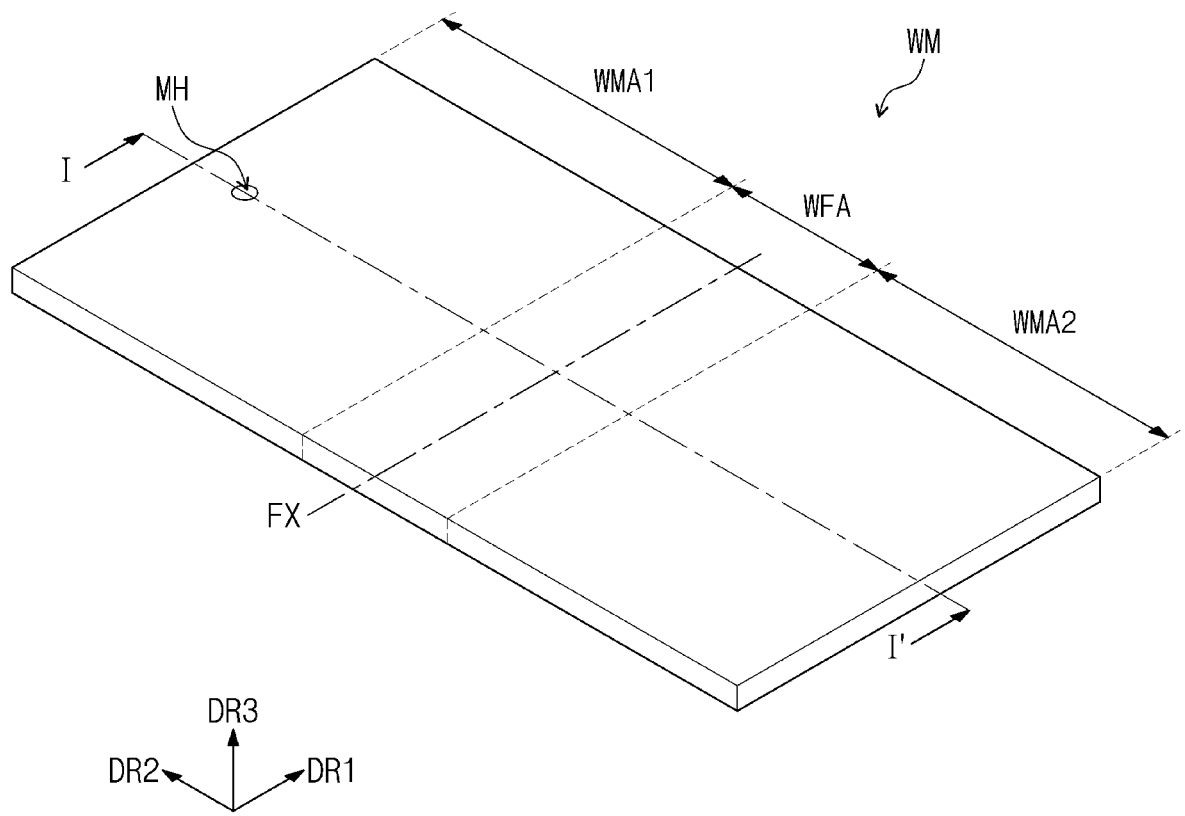
FIG. 4 is a schematic perspective view of a window according to an embodiment of the disclosure.
Figure 5:
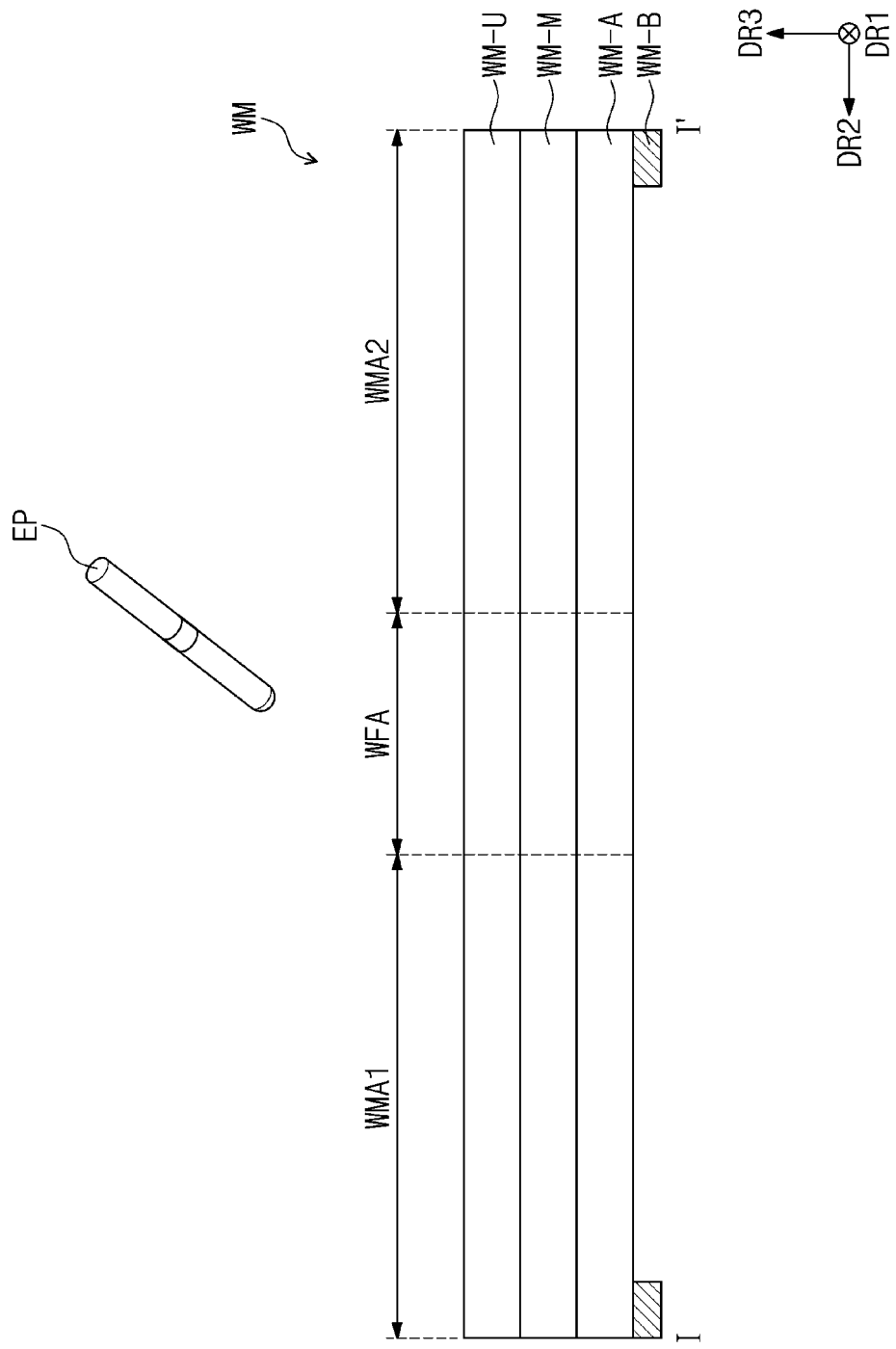
FIG. 5 is a schematic cross-sectional view of a window taken along line I-I' of FIG. 4 according to an embodiment of the disclosure.
Figure 6:
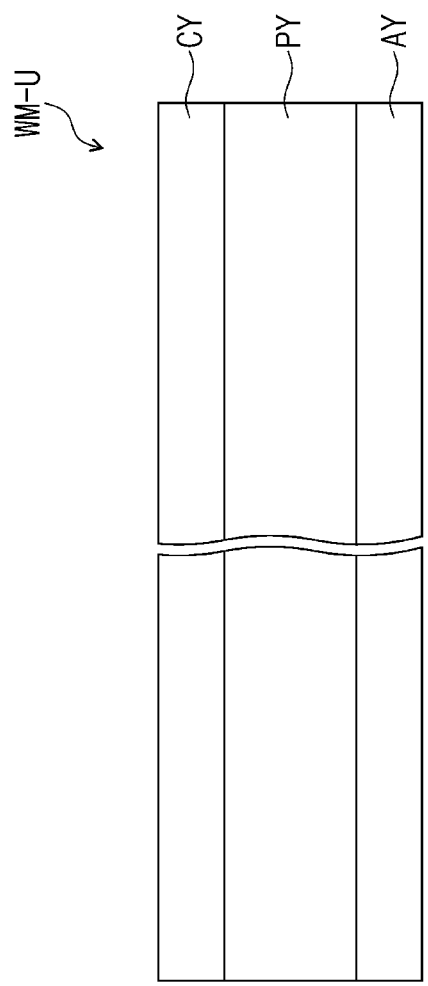
FIG. 6 is a schematic cross-sectional view of a protective functional layer of FIG. 5 according to an embodiment of the disclosure.

FIG. 4 is a schematic perspective view of a window according to an embodiment. FIG. 5 is a schematic cross-sectional view of the window, taken along line I-I' of FIG. 4 according to an embodiment. FIG. 6 is a schematic cross-sectional view of a protective functional layer of FIG. 5 according to an embodiment.

Hereinafter, for convenience of description, a window WM in a non-folded state is illustrated in FIGS. 4 to 6.

Referring to FIG. 4, the window WM includes a first area WMA1, a second area WMA2, and a third area WFA. In the disclosure, the third area WFA may be defined as a window folding area.

The first area WMA1, the second area WMA2, and the third area WFA may correspond to the first non-folding area NFA1, the second non-folding area NFA2, and the folding area FA, respectively.

According to an embodiment, the window WM may include a first material in the first area WMA1 and the second area WMA2, and a second material, the type of which is different than that of the first material, in the third area WFA.

Particularly, the second material may have an elastic modulus lower than that of the first material. As a result, the third area WFA made of (or including) the second material may be easily folded compared to the first area WMA1 and the second area WMA2 made of the first material. For example, the first material may be provided as glass, plastic, a film, or the like, and the second material may be provided as urethane silicone, urethane acrylic, or the like. However, the first material which corresponds to the first area WMA1 and the second area WMA2 and the second material which corresponds to the third area WFA are not limited thereto and may be provided as various types of materials.

Referring to FIG. 5, the window WM includes a protective functional layer WM-U, a window layer WM-M, an adhesive layer WM-A, and a light blocking layer WM-B. Here, components included in the window WM are not limited to the components mentioned above. At least a portion of the components mentioned above may be omitted, or other components may be added.

The protective functional layer WM-U may be disposed on the outermost surface of the display device DD. The protective functional layer WM-U may be a functional layer for improving usage characteristics of the display device DD. For example, anti-fingerprint characteristics, antifouling characteristics, and anti-scratch characteristics, and the like may be improved by the protective functional layer WM-U.

Referring to FIG. 6 in detail, the protective functional layer WM-U may include a coating layer CY, a protective layer PY, and a protective adhesive layer AY. The coating layer CY may be disposed on the outermost surface of the display device DD. The coating layer CY is a functional layer for improving the usage characteristics of the display device DD and may be provided as a coating or film type on the protective layer PY. The anti-fingerprint characteristics, the antifouling characteristics, and the anti-scratch characteristics, and the like may be improved by the coating layer CY.

The protective layer PY may be disposed below the coating layer CY. Components disposed below the protective layer PY may be protected by the protective layer PY. For example, the protective layer PY may include a film having an elastic modulus of about 15 GPa or less at room temperature. In an embodiment, the protective layer PY may be omitted.

The protective adhesive layer AY may be disposed below the protective layer PY. The protective layer PY and the window layer WM-M may be connected to each other by the protective adhesive layer AY.

Referring back to FIG. 5, the window layer WM-M may be disposed below the protective adhesive layer AY of the protective functional layer WM-U. The window layer WM-M may include an optically transparent insulating material. For example, the window layer WM-M may include a glass substrate or a synthetic resin film.

In a case where the window layer WM-M is a synthetic resin film, the window layer WM-M may include a polyimide (PI) film or a polyethylene terephthalate (PET) film.

The window layer WM-M may have a multilayer structure or a single layer structure. For example, the window layer WM-M may include synthetic resin films connected by an adhesive, or a glass substrate and a synthetic resin film which are connected to each other by an adhesive.

The first area WMA1 and the second area WMA2 including the first material and the third area WFA including the second material in the window WM described in FIG. 4 may correspond to the window layer WM-M. For example, the window layer WM-M may include the first and second materials different from each other so that the third area WFA is easily folded. Each of the protective functional layer WM-U and the adhesive layer WM-A may include a single material.

For example, the window layer WM-M corresponding to the first area WMA1 and the second area WMA2 defined as a non-folding area may include a rigid material such as glass and plastic. On the other hand, the window layer WM-M corresponding to the third area WFA that is foldable may include a flexible material.

The adhesive layer WM-A may be disposed below the window layer WM-M. The adhesive layer WM-A may connect the window WM to one of components of the display panel DP (see FIG. 3). However, the embodiment is not limited thereto, and the adhesive layer WM-A may be omitted or provided at another position.

The light blocking layer WM-B may overlap the bezel area BZA of the window WM illustrated in FIG. 3. The light blocking layer WM-B having various colors may be provided, and the color of the bezel area BZA of the window WM may be determined on the basis of the color of the light blocking layer WM-B.

An electronic pen EP may be provided as a touch pen and select information displayed on the display device DD. The display device DD may display the information selected by the electronic pen EP. In detail, as the electronic pen EP touches the uppermost surface of the window WM or approaches the window WM, the information selected by the electronic pen EP may be displayed through the display device DD.

Figure 7:
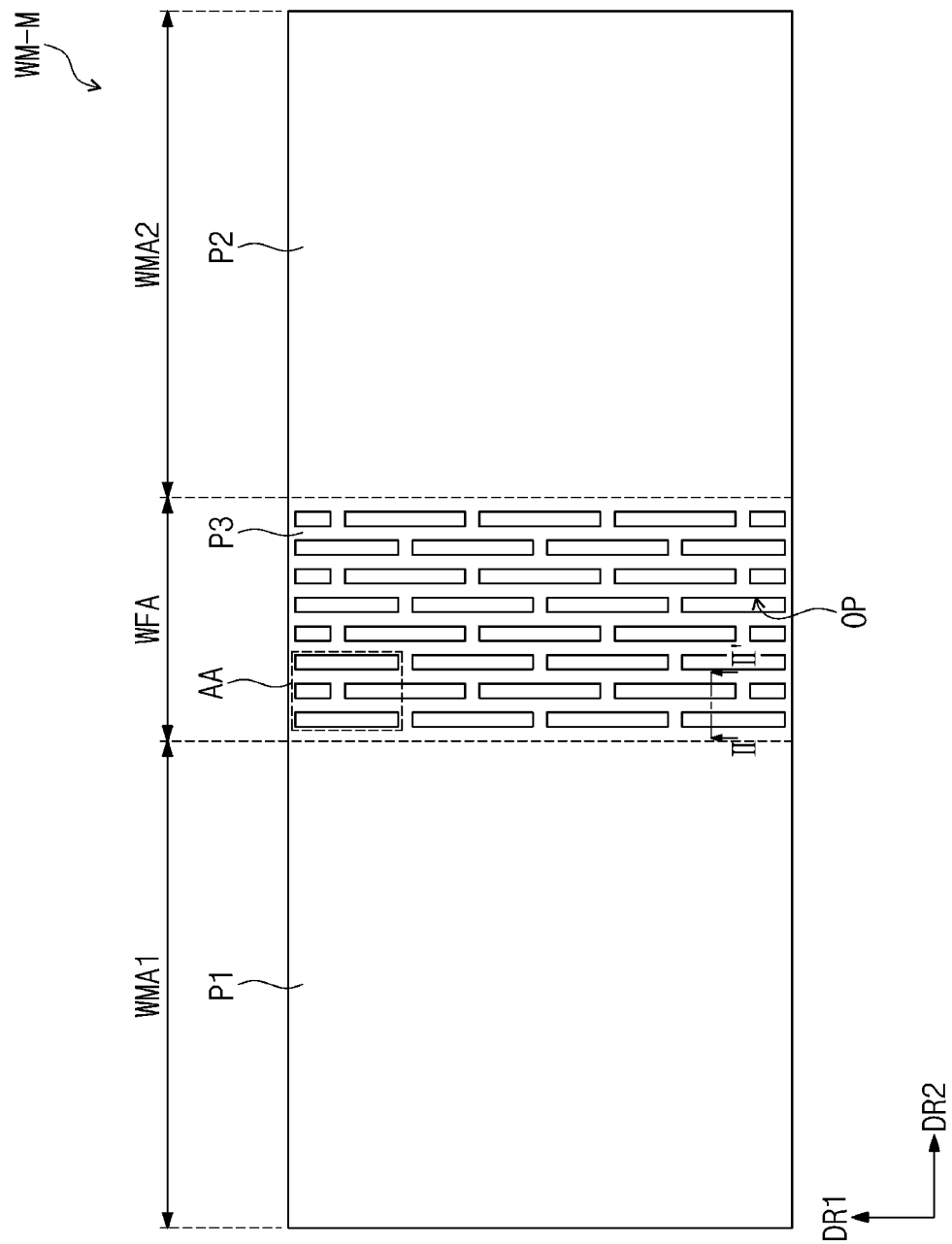
FIG. 7 is a schematic plan view of a window layer of FIG. 5 according to an embodiment of the disclosure.
Figure 8:
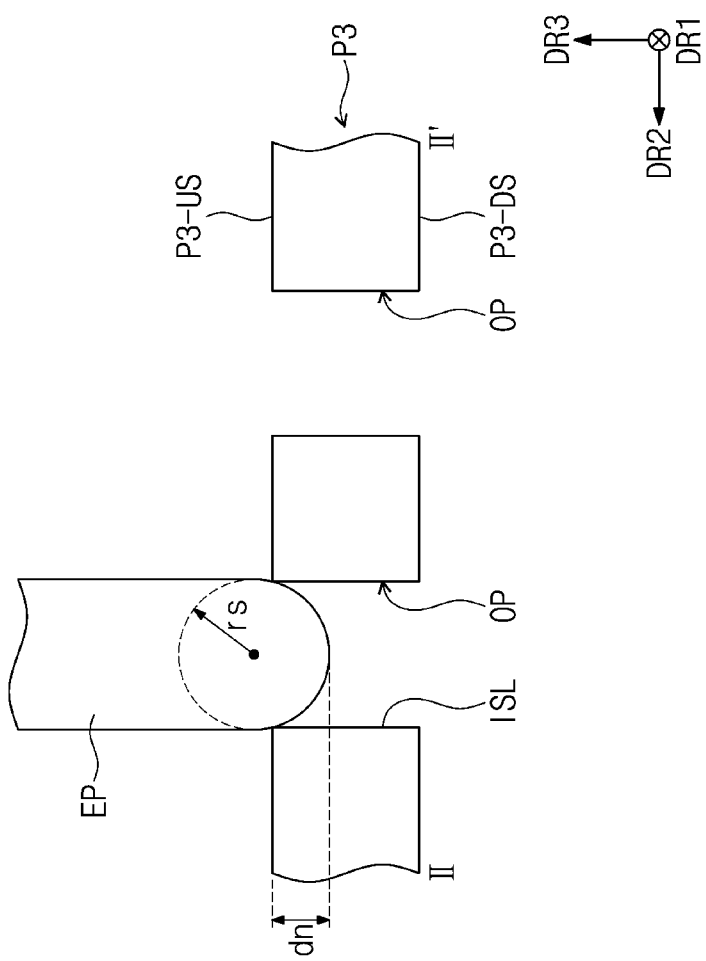
FIG. 8 is a schematic cross-sectional view of a window layer taken along line II-II' of FIG. 7 according to an embodiment of the disclosure.
Figure 9:
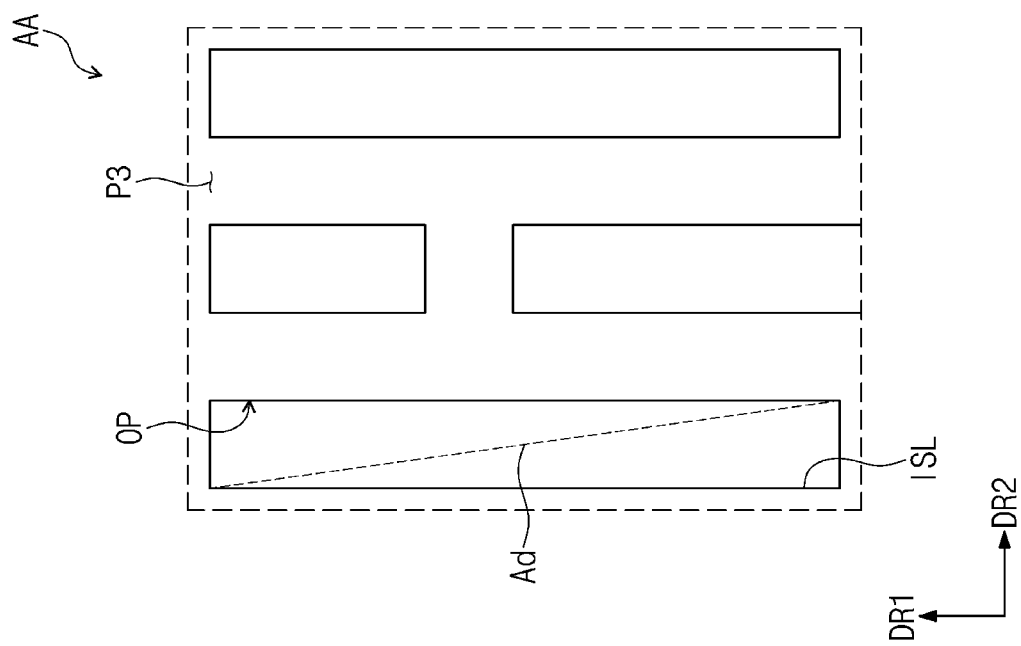
FIG. 9 is a schematic enlarged view of a region AA of FIG. 7 according to an embodiment of the disclosure.

FIG. 7 is a schematic plan view of the window layer of FIG. 5 according to an embodiment. FIG. 8 is a schematic cross-sectional view of the window layer, taken along line II-II' of FIG. 7 according to an embodiment. FIG. 9 is a schematic enlarged view of a region AA of FIG. 7 according to an embodiment.

Referring to FIG. 7, the window layer WM-M includes a first section P1, a second section P2, and a folding section P3 disposed between the first section P1 and the second section P2. The first section P1 may overlap the first area WMA1, the second section P2 may overlap the second area WMA2, and the folding section P3 may overlap the third area WFA.

According to an embodiment, the folding section P3 may include at least one opening pattern OP. For example, the opening pattern OP may be an opening that passes through the folding section P3. However, the embodiment is not limited thereto, and the opening pattern OP may have a shape which is recessed by a certain amount from a top surface of the folding section P3.

As illustrated in FIG. 7, the third area may include multiple opening patterns OP, which have a shape extending in a first direction DR1 substantially parallel to the folding axis FX. The opening pattern OP according to an embodiment may have a rectangular shape. Particularly, in a plan view, the opening patterns OP may have a non-regularized shape. For example, in the disclosure, the expression that the opening patterns OP have the non-regularized shape may mean that the opening patterns OP are not aligned in a second direction DR2.

As illustrated above in FIGS. 2A and 2B, the display device DD may be in-folded or out-folded. In this case, as the folding section P3 is folded along the folding axis FX, the magnitude of stress applied to the folding section P3 may increase. According to an embodiment, the magnitude of stress applied to the folding section P3 may be reduced by the opening pattern OP included in the folding section P3. As a result, damage of the folding section P3 due to the inner folding and the outer folding of the display device DD may be prevented.

The size of the opening pattern OP according to an embodiment may be determined based on the electronic pen EP illustrated in FIG. 5.

In detail, referring to FIG. 8, the folding section P3 includes a top surface P3-US and a bottom surface P3-DS. The electronic pen EP is disposed on the top surface P3-US, and position information or input information at a point touched by the electronic pen EP positioned above the top surface P3-US may be identified.

Particularly, the size of the opening pattern OP may be determined such that the electronic pen EP is prevented from being inserted into the opening pattern OP to a certain depth dn or greater in the third direction DR3. For example, the certain depth dn may be set to about 10 micrometers or less. In a case where the electronic pen EP is inserted into the opening pattern OP to the certain depth dn or greater in the third direction DR3, the folding section P3 may be damaged, or the time for restoring a soft material filled in the opening pattern OP may be lengthened. As the soft material is pressed by the electronic pen EP, a pressing by the electronic pen EP may be viewed from the outside. The soft material to be filled in the opening pattern OP will be described below with reference to FIG. 10.

Referring to FIG. 9, a distance Ad between two points, which corresponds to a maximum distance, on an inner line ISL of the folding section P3 that defines the opening pattern OP may be set based on a radius rs of curvature of the electronic pen EP illustrated in FIG. 8 and a depth of the electronic pen EP inserted into the opening pattern OP.

In more detail, the distance Ad between two points, which corresponds to a maximum distance, on the inner line ISL of the folding section P3 that defines the opening pattern OP in a plan view may be set to about 10 micrometers to about 200 micrometers. For example, the distance Ad according to the opening pattern OP having a rectangular shape illustrated in FIG. 9 may correspond to a diagonal distance.

For example, in a case where the distance Ad of the opening pattern OP is set to about 200 micrometers or less, the depth of the electronic pen EP pressing the opening pattern OP may be the certain depth dn or less as illustrated in FIG. 8. As a result, a damage to the folding section P3 due to the electronic pen EP may be prevented, and the pressing by the electronic pen EP may be prevented from being viewed from the outside.

Figure 10:
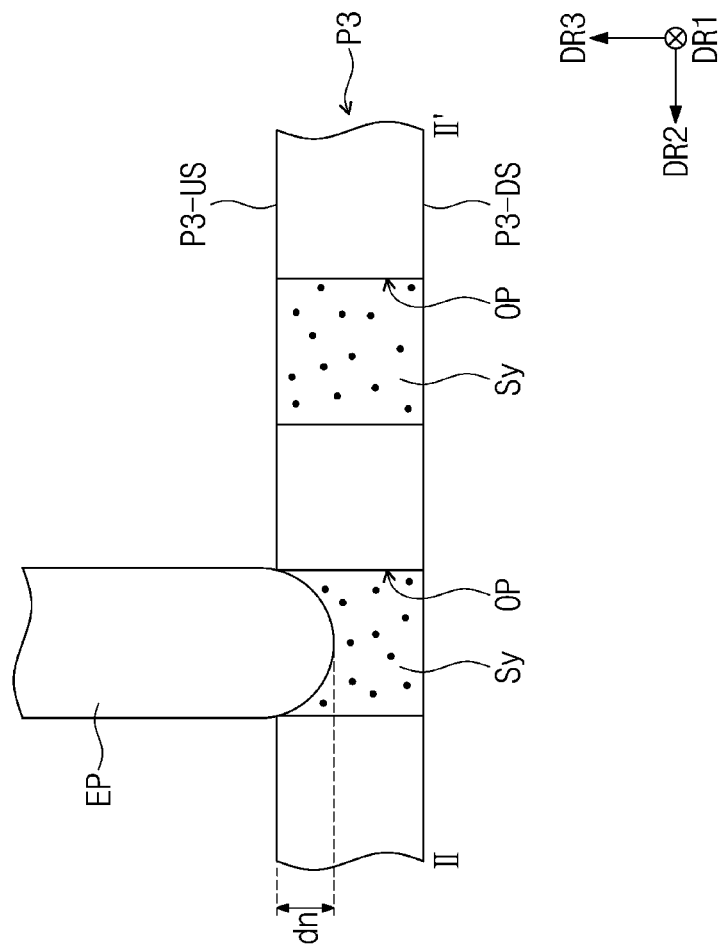
FIG. 10 is a schematic cross-sectional view of a window layer taken along line II-II' of FIG. 7 according to another embodiment of the disclosure.

FIG. 10 is a schematic cross-sectional view of a window layer, taken along line II-II' of FIG. 7 according to another embodiment.

Referring to FIG. 10, an assistant material Sy may be disposed in the folding section P3 illustrated in FIG. 8. The assistant material Sy may be transparent and have flexible characteristics. As illustrated in FIG. 10, in case that the electronic pen EP touches the assistant material Sy from the outside, the assistant material Sy may be partially pressed by the electronic pen EP.

According to an embodiment, as the opening pattern OP is set to the size illustrated above in FIGS. 8 and 9, the depth of the assistant material Sy pressed by the electronic pen EP may be set to the certain depth dn. For example, compared to the embodiment of the folding section P3 illustrated in FIG. 8, the folding section P3 illustrated in FIG. 10 may have further improved strength or rigidity with respect to external touch because the opening pattern OP of the folding section P3 is filled with the assistant material Sy.

Figure 12:
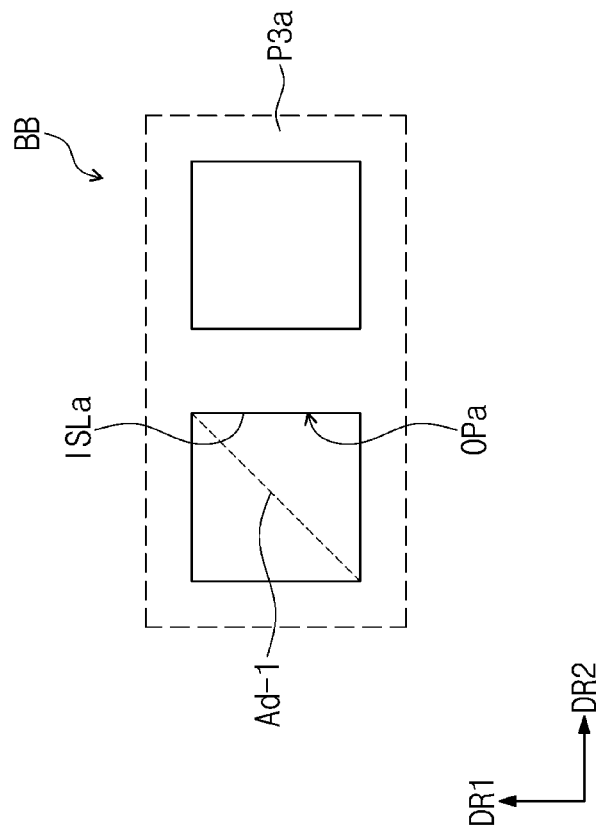
FIG. 12 is a schematic enlarged view of a region BB of FIG. 11 according to another embodiment of the disclosure.

FIG. 11 is a schematic plan view of a window layer according to another embodiment. FIG. 12 is an enlarged view of a region BB in FIG. 11 according to another embodiment.

In a window layer WM-Ma illustrated in FIG. 11, a shape of an opening pattern OPa included in a folding section P3a is modified compared to the window layer WM-M illustrated in FIG. 7, and the other components may be substantially the same. Hereinafter, the shape of the opening pattern OPa will be mainly described with reference to FIGS. 11 and 12.

Referring to FIG. 11, the opening pattern OPa included in the folding section P3a may have a square shape. The third area WFA may include multiple opening patterns OPa, which are spaced apart from each other.

As illustrated in FIG. 12, a distance Ad-1 between two points, which corresponds to a maximum distance, on an inner line ISLa of the folding section P3a that defines the opening pattern OPa may be set to about 10 micrometers to about 200 micrometers. For example, the distance Ad-1 according to the opening pattern OPa having the square shape illustrated in FIG. 12 may correspond to a diagonal distance.

For example, in a case where the distance Ad-1 of the opening pattern OPa is set to about 200 micrometers or less, the depth of the electronic pen EP pressing the opening pattern OPa may be a certain depth or less. As a result, the damage to the folding section P3a due to the electronic pen EP may be prevented, and the pressing by the electronic pen EP may be prevented from being viewed from the outside.

Figure 13:
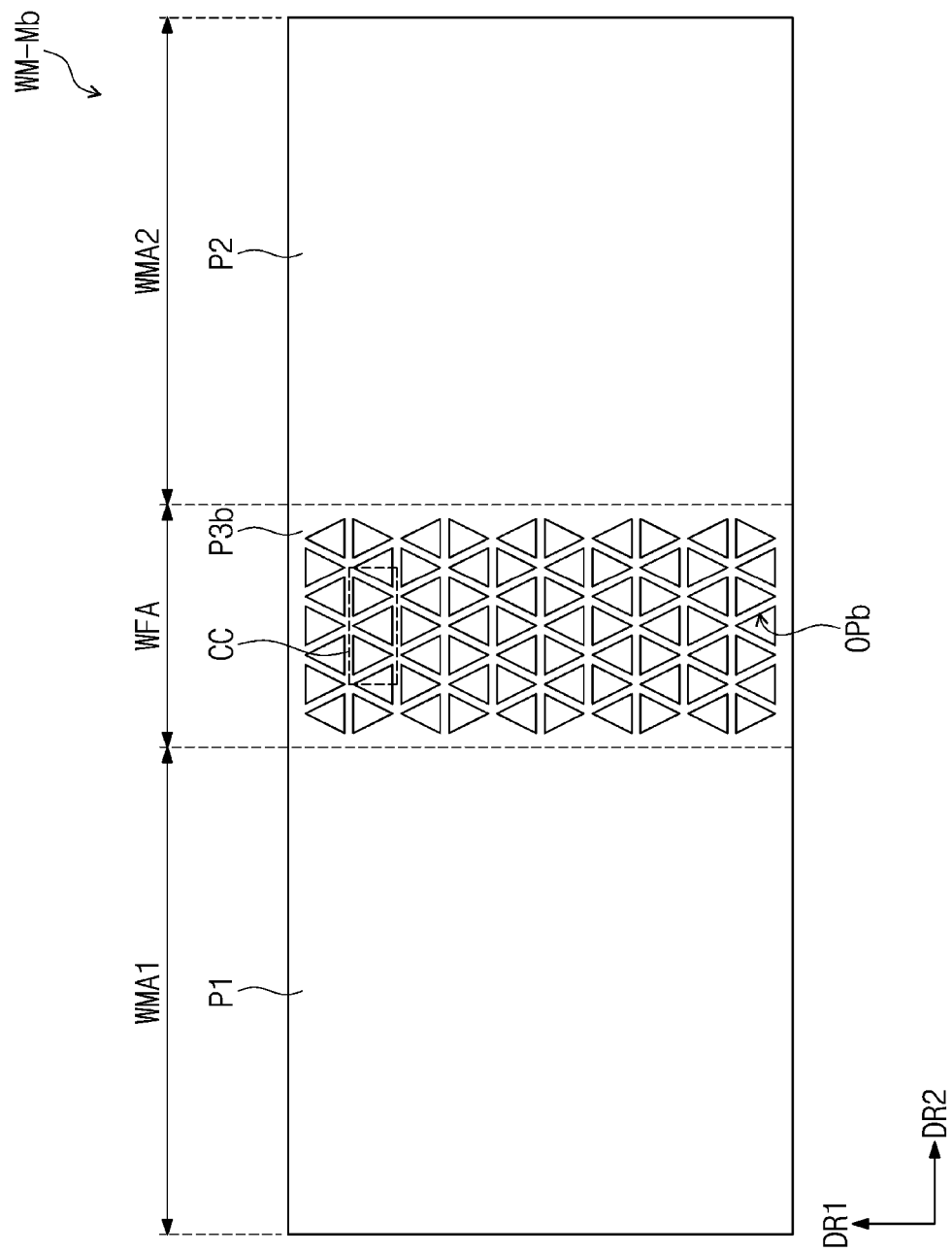
FIG. 13 is a schematic plan view of a window layer according to another embodiment of the disclosure.
Figure 14:
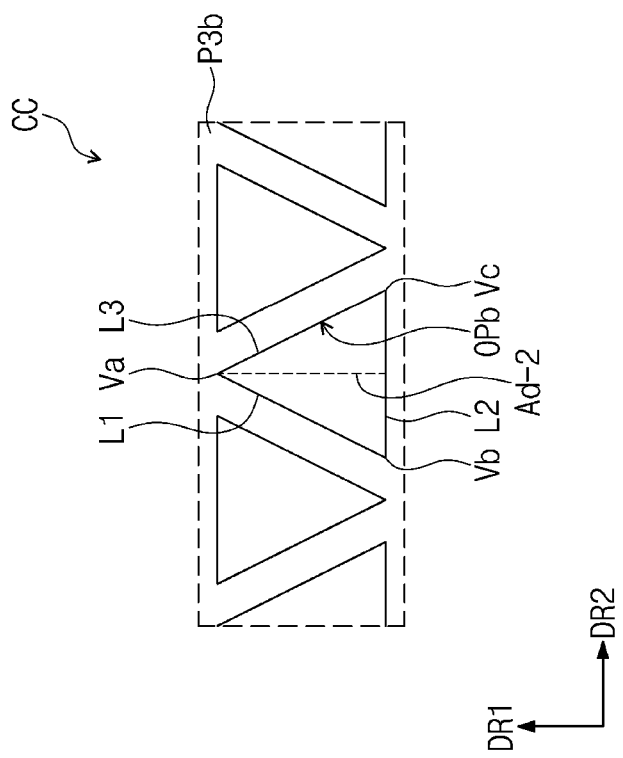
FIG. 14 is a schematic enlarged view of a region CC of FIG. 13 according to another embodiment of the disclosure.

FIG. 13 is a schematic plan view of a window layer according to another embodiment. FIG. 14 is a schematic enlarged view of a region CC of FIG. 13 according to another embodiment.

In a window layer WM-Mb illustrated in FIG. 13, a shape of an opening pattern OPb included in a folding section P3b is modified compared to the window layer WM-M illustrated in FIG. 7, and the other components may be substantially the same. Hereinafter, the shape of the opening pattern OPb will be mainly described with reference to FIGS. 13 and 14.

Referring to FIG. 13, the opening pattern OPb included in the folding section P3b may have a triangular shape. The folding section P3b may include multiple opening patterns OPb, which are spaced apart from each other.

As illustrated in FIG. 14, a distance Ad-2 between two points, which corresponds to a maximum distance, on an inner line of the folding section P3b that defines the opening pattern OPb may be set to about 10 micrometers to about 200 micrometers.

In detail, the inner line of the folding section P3b that defines the opening pattern OPb includes first to third inner lines L1, L2, and L3. The first inner line L1 may be defined as a line between a first vertex Va and a second vertex Vb. The second inner line L2 may be defined as a line between the second vertex Vb and a third vertex Vc. The third inner line L3 may be defined as a line between the third vertex Vc and the first vertex Va.

The two points defining the distance Ad-2 may correspond to one vertex of the first to third vertices Va, Vb, and Vc and one inner line spaced apart from the one vertex. Particularly, an angle between the distance Ad-2 and the one inner line may be a right angle. The opening pattern OPb having an equilateral triangular shape is illustrated as an example in FIGS. 13 and 14, but the opening pattern OPb may have various triangular shapes such as an isosceles triangle.

Figure 15:
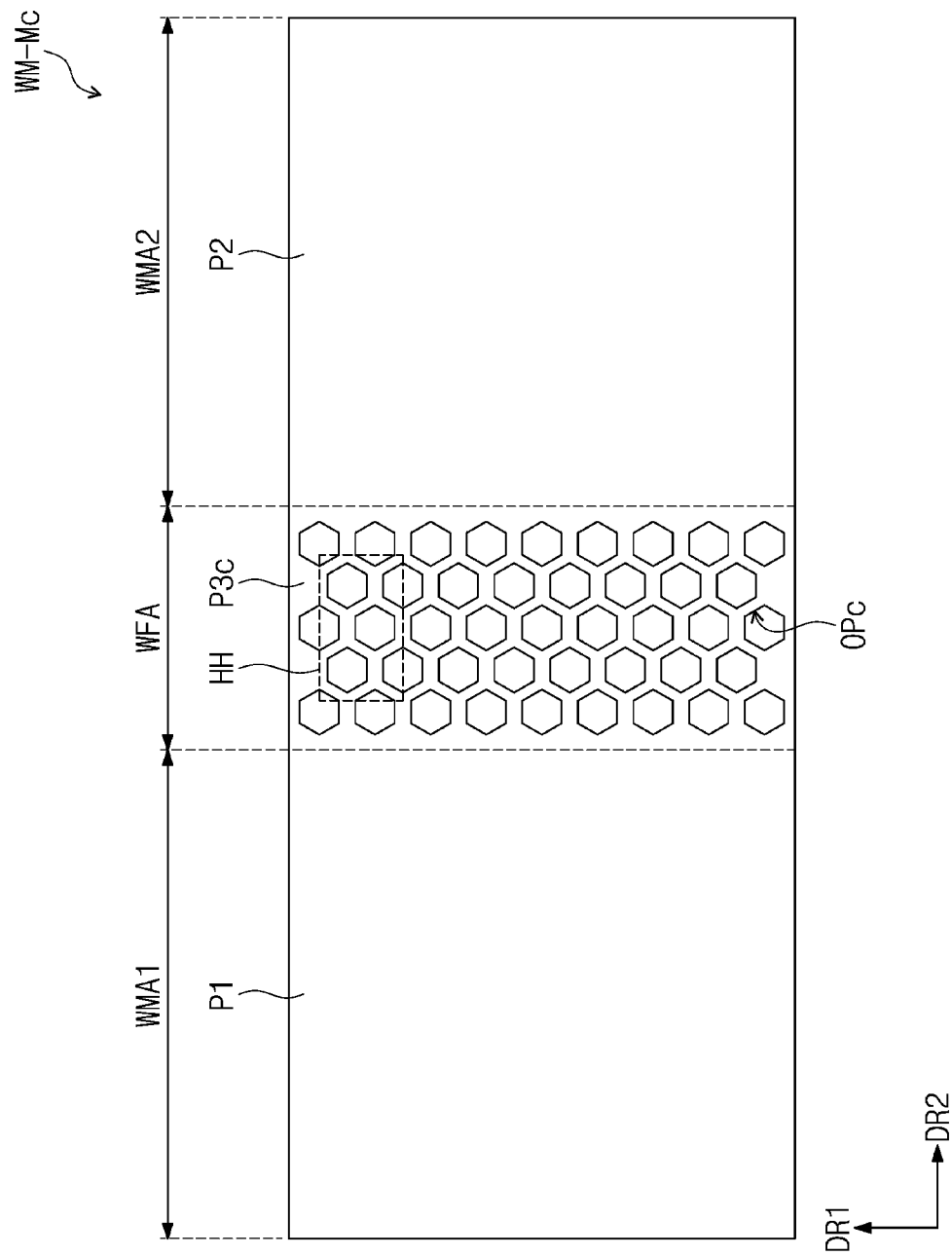
FIG. 15 is a schematic plan view of a window layer according to another embodiment of the disclosure.
Figure 16:
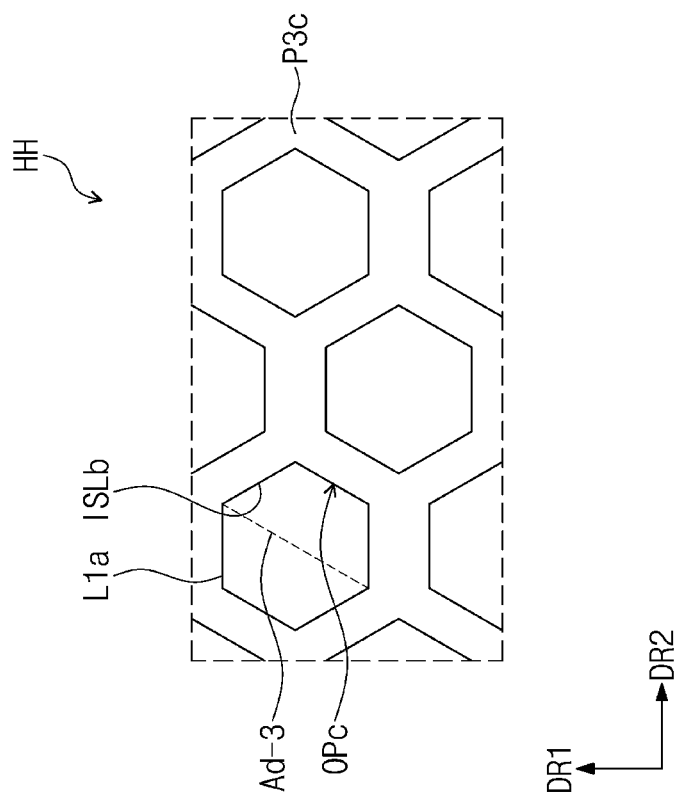
FIG. 16 is a schematic enlarged view of a region HH of FIG. 15 according to another embodiment of the disclosure.

FIG. 15 is a schematic plan view of a window layer according to another embodiment. FIG. 16 is a schematic enlarged view of a region HH of FIG. 15 according to another embodiment.

In a window layer WM-Mc illustrated in FIG. 15, a shape of an opening pattern OPc included in a folding section P3c is modified compared to the window layer WM-M illustrated in FIG. 7, and the other components may be substantially the same. Hereinafter, the shape of the opening pattern OPc will be mainly described with reference to FIGS. 15 and 16.

Referring to FIG. 15, the opening pattern OPc included in the folding section P3c may have a regular hexagonal shape. The third area WFA may include multiple opening patterns OPc, which are spaced apart from each other.

As illustrated in FIG. 16, a distance Ad-3 between two points, which corresponds to a maximum distance, on an inner line ISLb of the folding section P3c that defines the opening pattern OPc may be set to about 10 micrometers to about 200 micrometers.

The opening pattern OPc having the regular hexagonal shape may include six inner lines L1a having substantially the same length. In this case, the opening pattern OPc having the regular hexagonal shape may be substantially symmetric with respect to the distance Ad-3.

Figure 17A:
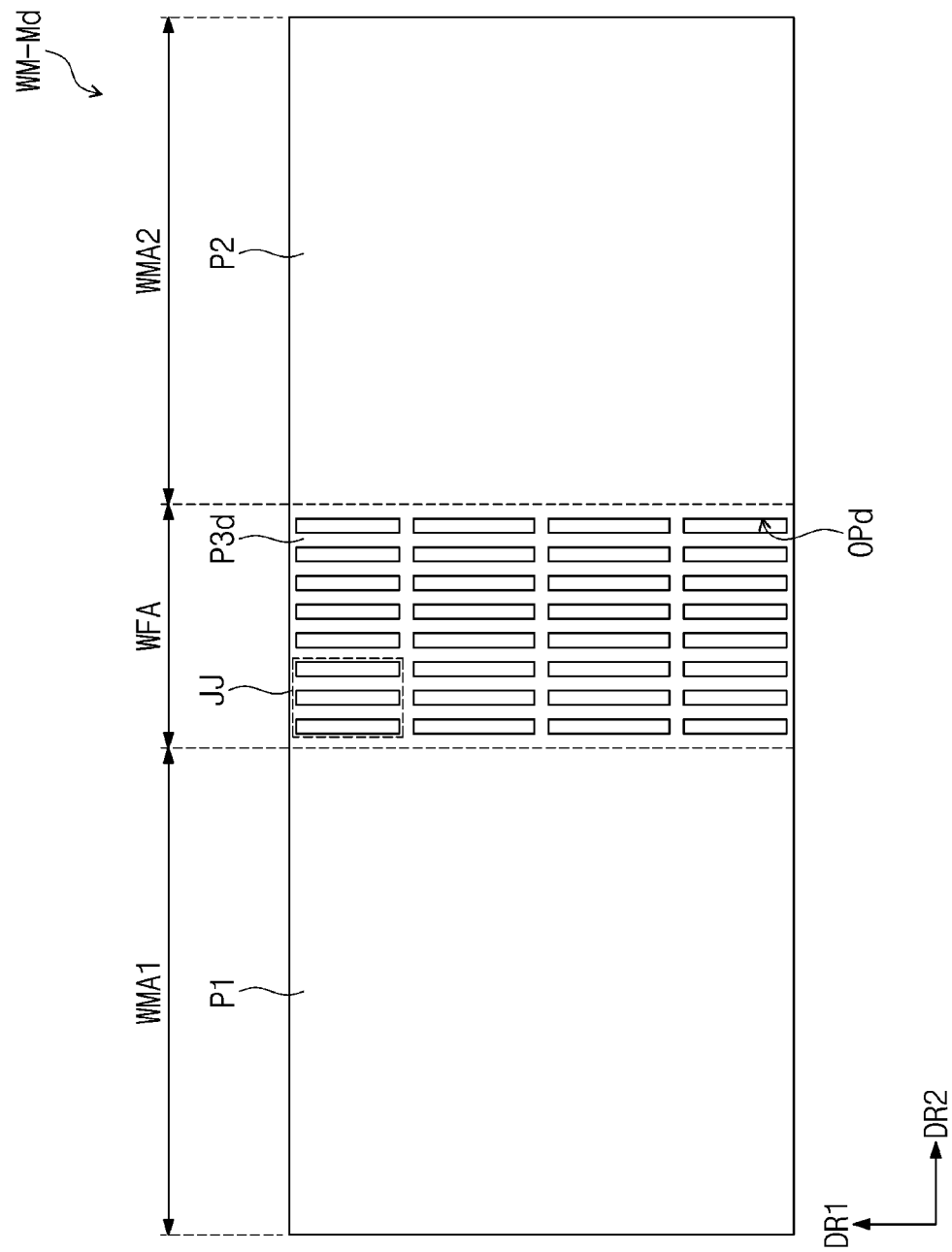
FIG. 17A is a schematic plan view of a window layer according to another embodiment of the disclosure.
Figure 17B:
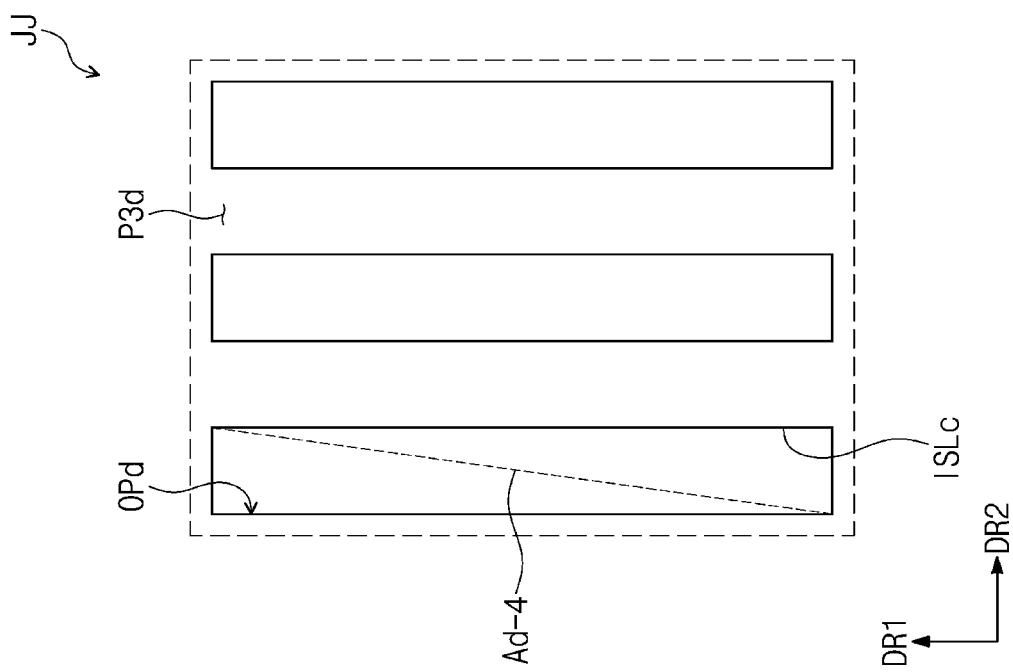
FIG. 17B is a schematic enlarged view of a region JJ of FIG. 17A according to another embodiment of the disclosure.

FIG. 17A is a schematic plan view of a window layer according to another embodiment of the disclosure. FIG. 17B is a schematic enlarged view of a region JJ of FIG. 17A according to another embodiment of the disclosure.

Referring to FIG. 17A, a window layer WM-Md may include an opening pattern OPd having a rectangular shape. In this case, the third area WFA may include multiple opening patterns OPd, which have a regularized shape. For example, the opening patterns OPd may have a shape aligned in the second direction DR2.

As illustrated in FIG. 17B, a distance Ad-4 between two points, which corresponds to a maximum distance, on an inner line ISLc of the folding section P3d that defines each of the opening patterns OPd may be set to about 10 micrometers to about 200 micrometers. For example, the distance Ad-4 according to the opening pattern OPd having the rectangular shape illustrated in FIG. 17B may correspond to a diagonal distance.

Figure 18B:
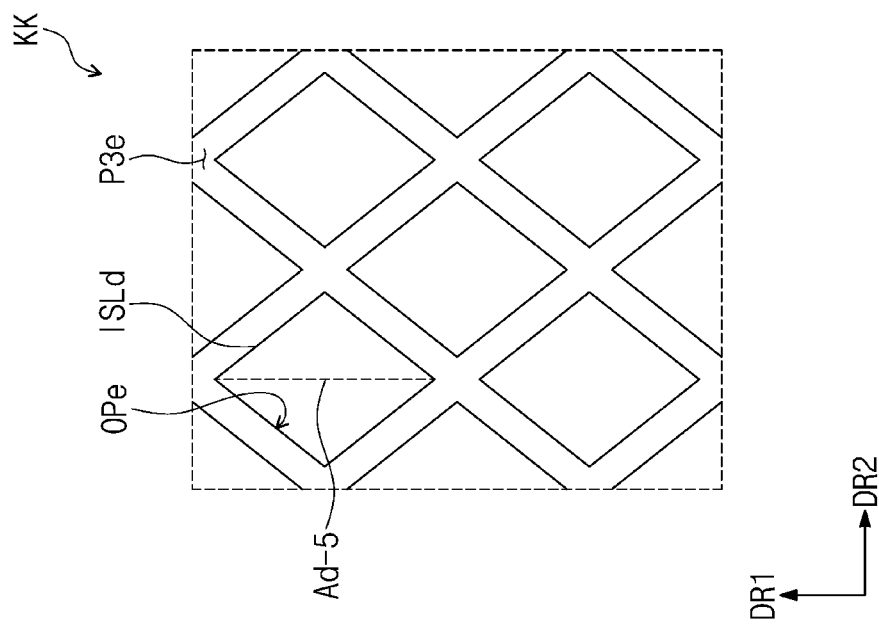
FIG. 18B is a schematic enlarged view of a region KK of FIG. 18A according to another embodiment of the disclosure.

FIG. 18A is a schematic plan view of a window layer according to another embodiment. FIG. 18B is a schematic enlarged view of a region KK of FIG. 18A according to another embodiment.

Referring to FIG. 18A, a window layer WM-Me may include an opening pattern OPe having a rhombic shape. The third area WFA may include multiple opening patterns OPe.

As illustrated in FIG. 18B, a distance Ad-5 between two points, which corresponds to a maximum distance, on an inner line ISLd of the folding section P3e that defines each of the opening patterns OPe may be set to about 10 micrometers to about 200 micrometers. For example, the distance Ad-5 in the opening pattern OPe having the rhombic shape may correspond to a distance between two facing vertices of the four vertices. Particularly, the distance Ad-5 between the two vertices may correspond to a diagonal distance of the rhombic shape.

The opening patterns OPe illustrated in FIG. 18B may be provided as a regularized shape or a non-regularized shape.

Figure 19B:
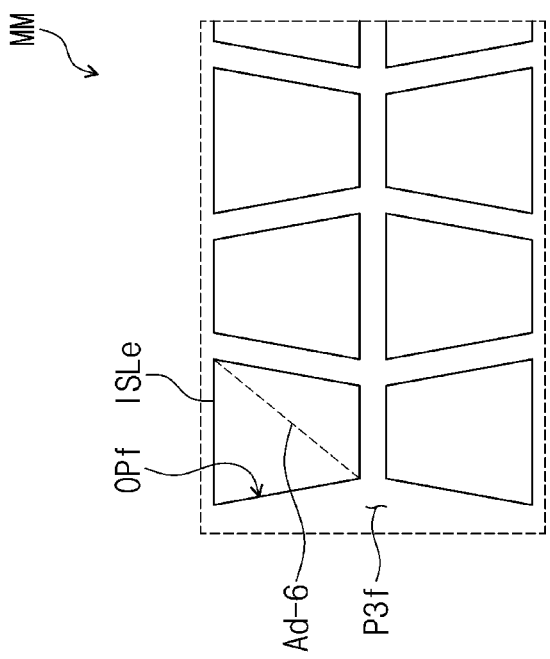
FIG. 19B is a schematic enlarged view of a region MM of FIG. 19A according to another embodiment of the disclosure.

FIG. 19A is a schematic plan view of a window layer according to another embodiment. FIG. 19B is a schematic enlarged view of a region MINI of FIG. 19A according to another embodiment.

Referring to FIG. 19A, a window layer WM-Mf may include an opening pattern OPf having a trapezoidal shape. The third area WFA may include multiple opening patterns OPf.

As illustrated in FIG. 19B, a distance Ad-6 between two points, which corresponds to a maximum distance, on an inner line ISLe of the folding section P3f that defines each of the opening patterns OPf having the trapezoidal shape may be set to about 10 micrometers to about 200 micrometers.

For example, the distance Ad-6 according to the opening pattern OPf having the trapezoidal shape may correspond to a distance between two facing vertices of the four vertices. Particularly, the distance Ad-6 between the two vertices may correspond to a diagonal distance of the trapezoidal shape.

As described above, the window layers WM-M, WM-Ma, WM-Mb, WM-Mc, WM-Md, WM-Me, and WM-Mf according to the embodiments of the disclosure may include the opening patterns having various shapes. Particularly, as the size of the opening pattern in a plan view is preset, the damage due to an external electronic pen may be prevented, and the pressing by an external electronic pen may be prevented from being viewed from the outside.

According to an embodiment of the disclosure, the folding section of the window may include the at least one opening pattern. Particularly, as the size of the opening pattern in a plan view is preset, the damage due to the electronic pen may be prevented, and the pressing by the electronic pen may be prevented from being viewed from the outside.

Some embodiments of the disclosure have been described in the drawings and the specification. While specific terms were used, they were not used to limit the meaning or the scope of the disclosure described in the claims but merely used to explain an embodiment of the disclosure. Accordingly, those skilled in the art will understand that various modifications and other equivalent embodiments are also possible. Hence, the protective scope of the claimed invention shall be determined by the accompanying claims.

What is claimed is:

1. A window, comprising:
   a window layer that includes:
   a first section;
   a second section; and
   a folding section that is disposed between the first section and the second section and is foldable with respect to a folding axis extending in a direction, wherein
   the folding section comprises at least one opening pattern, the at least one opening pattern each including an opening penetrating from a top surface to a bottom surface of the folding section,
   in a plan view, a maximum distance between two points on an inner line of the folding section that defines a single shape of the at least one opening pattern is about 10 micrometers to about 200 micrometers, the maximum distance being different from both a length and a width of the single shape,
   the width of the single shape is constant in one direction perpendicular to a thickness direction of the window,
   each of the first section and the second section comprises a first material, and the folding section comprises a second material having an elastic modulus lower than an elastic modulus of the first material, and
   the folding section does not comprise the first material.

2. The window of claim 1, wherein in a plan view, the at least one opening pattern has a quadrilateral shape.

3. The window of claim 2, wherein the maximum distance is a diagonal distance of the quadrilateral shape.

4. The window of claim 2, wherein the at least one opening pattern has a rectangular shape extending in the direction.

5. The window of claim 2, wherein the at least one opening pattern has a square shape.

6. The window of claim 1, wherein in a plan view, the at least one opening pattern has a triangular shape.

7. The window of claim 6, wherein
   the inner line of the folding section comprises:
   a first inner line between a first vertex and a second vertex of the triangular shape;
   a second inner line between the second vertex and a third vertex of the triangular shape; and
   a third inner line between the third vertex and the first vertex of the triangular shape,
   the two points of the inner line of the folding section are any one vertex of the first to third vertices and a point on any one inner line spaced apart from the any one vertex.

8. The window of claim 7, wherein an angle between the maximum distance and the one inner line is a right angle.

9. The window of claim 1, wherein
   the first material is glass, and
   the second material includes at least one of urethane and silicone.

10. The window of claim 1, further comprising:
    a protective functional layer disposed above the window layer;
    an adhesive layer disposed below the window layer; and
    a light blocking layer that does not overlap the folding section and is disposed below the adhesive layer.

11. The window of claim 1, further comprising an assistant material that is flexible and disposed in the opening of the at least one opening pattern.

12. The window of claim 1, wherein
    the at least one opening pattern comprises a plurality of opening patterns and spaced apart from each other, and
    in a plan view, each of the plurality of opening patterns has a regular polygonal shape.

13. The window of claim 1, wherein in a plan view, the at least one opening pattern has a trapezoidal shape.

14. The window of claim 1, wherein in a plan view, the at least one opening pattern has a rhombic shape.

15. A display device comprising:
    a display panel; and
    a window that is disposed on the display panel, the window comprising:
    a first area;
    a second area; and
    a folding area disposed between the first area and the second area, wherein
    the window comprises at least one opening pattern that overlaps the folding area, the at least one opening pattern each including an opening penetrating from a top surface to a bottom surface of the folding area of the window, in a plan view, a maximum distance between two points on an inner line of the window that defines a single shape of the at least one opening pattern is about 10 micrometers to about 200 micrometers, the maximum distance being different from both a length and a width of the single shape, the width of the single shape is constant in a one direction perpendicular to a thickness direction of the window, each of the first area and the second area comprises a first material, and the folding area comprises a second material having an elastic modulus lower than an elastic modulus of the first material, and the folding area does not comprise the first material.

16. The display device of claim 15, wherein each of the first area and the second area is flat and has a planar area larger than a planar area of the folding area.

17. The display device of claim 15, wherein
the window is foldable with respect to a folding axis that extends in a direction, and
the at least one opening pattern extends in the direction.

18. The display device of claim 17, wherein
the at least one opening pattern comprises a plurality of opening patterns, and
the plurality of opening patterns have a shape regularized along another direction perpendicular to the direction.

19. The display device of claim 15, wherein in a plan view, the at least one opening pattern has a regular polygonal shape.

20. The display device of claim 15, wherein
the at least one opening pattern comprises a plurality of opening patterns, and
in a plan view, at least part of the plurality of opening patterns have a non-regularized shape.

21. A window, comprising:
a window layer that comprises:
  a first section;
  a second section; and
  a folding section disposed between the first section and the second section, wherein
the folding section comprises at least one opening pattern, the at least one opening pattern each including an opening penetrating from a top surface to a bottom surface of the folding section,
in a plan view, a maximum distance between two points on an inner line of the folding section that defines a single shape of the at least one opening pattern is set based on a radius of curvature of an external electronic pen that faces a top surface of the folding section and a depth of the external electronic pen inserted from the top surface of the folding section into the at least one opening pattern, the maximum distance being different from both a length and a width of the single shape,
the depth of the external electronic pen inserted from the top surface of the folding section into the at least one opening pattern is about 10 micrometers or less,
each of the first section and the second section comprises a first material, and the folding section comprises a second material having an elastic modulus lower than an elastic modulus of the first material, and
the folding section does not comprise the first material.

* * * * *